US008600151B2

(12) United States Patent
Beato et al.

(10) Patent No.: US 8,600,151 B2
(45) Date of Patent: Dec. 3, 2013

(54) PRODUCING STEREOSCOPIC IMAGE

(75) Inventors: Louis James Beato, Rochester, NY (US); Andrew C. Blose, Penfield, NY (US)

(73) Assignee: Apple Inc., Cupertino, CA (US)

(*) Notice: Subject to any disclaimer, the term of this patent is extended or adjusted under 35 U.S.C. 154(b) by 291 days.

(21) Appl. No.: 12/983,343

(22) Filed: Jan. 3, 2011

(65) Prior Publication Data
US 2012/0170831 A1   Jul. 5, 2012

(51) Int. Cl.
*H04N 15/00* (2006.01)
*G03B 27/32* (2006.01)
*G02B 27/22* (2006.01)

(52) U.S. Cl.
USPC ............... 382/154; 348/42; 355/22; 359/462

(58) Field of Classification Search
USPC .............. 382/154; 348/42, 51, 49, 47, 43, 56, 348/E13.059, E13.04, E13.033, E13.046, 348/E13.014, E13.025, E13.071, E13.038, 348/E13.058, E13.029, E13.072, E13.042, 348/E13.073, E13.03, E13.023, E13.044, 348/E13.05, E13.052, E13.063, E13.064, 348/E13.037, E13.041, E13.049, E13.031, 348/E13.007, E13.061, E13.026; 345/8; 353/101; 355/8, 22; 359/464, 462
See application file for complete search history.

(56) References Cited

U.S. PATENT DOCUMENTS

| | | | |
|---|---|---|---|
| 4,967,276 A | 10/1990 | Murakami et al. | |
| 5,325,193 A | 6/1994 | Pritchard | |
| 5,883,695 A | 3/1999 | Paul | |
| 6,271,876 B1 | 8/2001 | McIntyre et al. | |
| 6,473,462 B1 | 10/2002 | Chevance et al. | |
| 6,798,406 B1* | 9/2004 | Jones et al. | 345/419 |
| 7,466,336 B2 | 12/2008 | Regan | |
| 7,557,824 B2* | 7/2009 | Holliman | 348/46 |
| 7,606,417 B2* | 10/2009 | Steinberg et al. | 382/173 |
| 8,022,987 B2* | 9/2011 | Ko et al. | 348/143 |
| 8,325,219 B2* | 12/2012 | Era | 348/42 |
| 2010/0103168 A1 | 4/2010 | Jung | |
| 2010/0321390 A1 | 12/2010 | Kim et al. | |

FOREIGN PATENT DOCUMENTS

| | | |
|---|---|---|
| EP | 1 619 903 | 1/2006 |
| WO | 2004066203 | 8/2004 |

OTHER PUBLICATIONS

Global Motion Estimation in Image Sequences Using Robust Vector Field Segmentation, Proceedings ACM Multimedia 99, Orlando, Florida, Oct. 30-Nov. 5, 1999, pp. 261-264.
International Search Report and Written Opinion received in corresponding PCT Application No. PCT/US2011/067703, dated Mar. 29, 2012.

* cited by examiner

*Primary Examiner* — Sheela Chawan
(74) *Attorney, Agent, or Firm* — Wong, Cabello, Lutsch, Rutherford & Brucculeri, LLP

(57) ABSTRACT

A method of producing a digital stereoscopic image using a processor is disclosed. The method includes providing a plurality of digital image files which include digital images and the time of capture of each image and using time of capture to identify candidate pairs of images. The method further includes using the processor to analyze the image content of the candidate pairs of images to identify at least one image pair that can be used to produce a stereoscopic image; and using an identified image pair to produce the digital stereoscopic image.

10 Claims, 6 Drawing Sheets

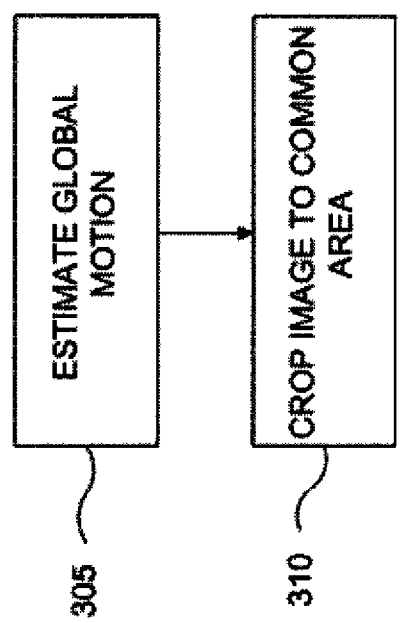

PRODUCING STEREOSCOPIC IMAGE

FIELD OF THE INVENTION

This invention relates to producing a stereoscopic image from a plurality of digital image files.

BACKGROUND OF THE INVENTION

Photographic and imaging systems are primarily designed for use in creating two-dimensional images. In a two-dimensional image, only one perspective is needed. Human vision, however, views scenes from two perspectives with one perspective provided by each eye of an observer. The parallax that exists between the perspectives is interpreted by the mind of the observer to provide depth information about the scene being viewed. Various electronic and photochemical imaging techniques have been developed that capture images of a scene taken from different perspectives. These images are later processed and displayed to a user so that one eye of an observer is exposed to an image of the scene from one perspective, while the other eye of the observer is exposed to another image taken from another perspective. This creates the parallax difference needed to create the appearance of depth in the mind of the observer.

In all multi-perspective imaging systems, the apparent depth in the scene is proportional to the extent of the parallax-induced differences between the presented images. The extent of such parallax-induced differences is determined in part by the degree of separation between the captured images and in part by the distance from the captured images to the scene. Typically, depth imaging systems combine images that are captured at generally the same distance from the scene. This simulates the way that the eyes of a human observer will see a scene. Accordingly, the apparent extent of depth in the resultant output is typically modified by varying the degree of separation between the captured images. This creates an important issue for a photographer in preparing a multi-perspective image: the challenge of selecting the proper combination of images needed to provide a desired depth effect.

In some cameras and photography methods, this challenge is met by the use of cameras that have a fixed separation between the images and thus, the perspective is pre-selected. For example, it is known to capture stereoscopic and depth images using cameras having multiple image capture systems to record multiple images of a scene. See for example, commonly assigned U.S. Pat. No. 6,271,876 entitled "Using Two Different Capture Media to Make Stereo Images of A Scene" filed by McIntyre et al. on May 6, 1997. See also U.S. Pat. No. 4,967,276 entitled "Apparatus for Formatting and Viewing a Stereoscopic Video Frame" filed by Gallaher. Alternatively, it is known to use a camera that provides a single optical path and that is moved along a fixed track. See also U.S. Pat. No. 5,883,695 entitled "Method and Apparatus for Producing Stereoscopic Images with Single Sensor" filed by of Paul on Sep. 19, 1997. See also U.S. Pat. No. 5,325,193 entitled "Single Camera Autostereoscopic Imaging System" filed by Pritchard on Oct. 20, 1992. In such systems, different perspectives are captured as the camera is moved to fixed locations along the path.

Another invention uses a way of adjustable parallax by giving the operator an indication of the separation of the left and right images. See U.S. Pat. No. 7,466,336 entitled "Camera and Method for Composing Multi-Perspective Image". In this system a capture device contains a mode switch which converts from mono to stereo image capture. This requires a special capture device with a mode switch which is an added expense and an inconvenience.

SUMMARY OF THE INVENTION

The present invention includes a method of producing a digital stereoscopic image, comprising using a processor to:

a) providing a plurality of digital image files which include digital images and the time of capture of each image;

b) using time of capture to identify candidate pairs of images;

c) using the processor to analyze the image content of the candidate pairs of images to identify at least one image pair that can be used to produce a stereoscopic image; and d) using an identified image pair to produce the digital stereoscopic image.

The present invention has the advantage that it provides an effective way to identify image pairs from a plurality of image files that can be used to produce a stereoscopic image. It is a feature of the present invention that it makes use of both time of capture of the image files and image content of these images that can produce a stereoscopic image.

BRIEF DESCRIPTION OF THE DRAWINGS

FIG. 3A is a flow diagram showing additional details of the align images step in FIG. 2;

DETAILED DESCRIPTION OF THE INVENTION

In the following description, some embodiments of the present invention will be described in terms that would ordinarily be implemented as software programs. Those skilled in the art will readily recognize that the equivalent of such software can also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein can be selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

The phrase, "digital image," as used herein, refers to any digital image, such as a digital still image or a digital video.

Figure 1:
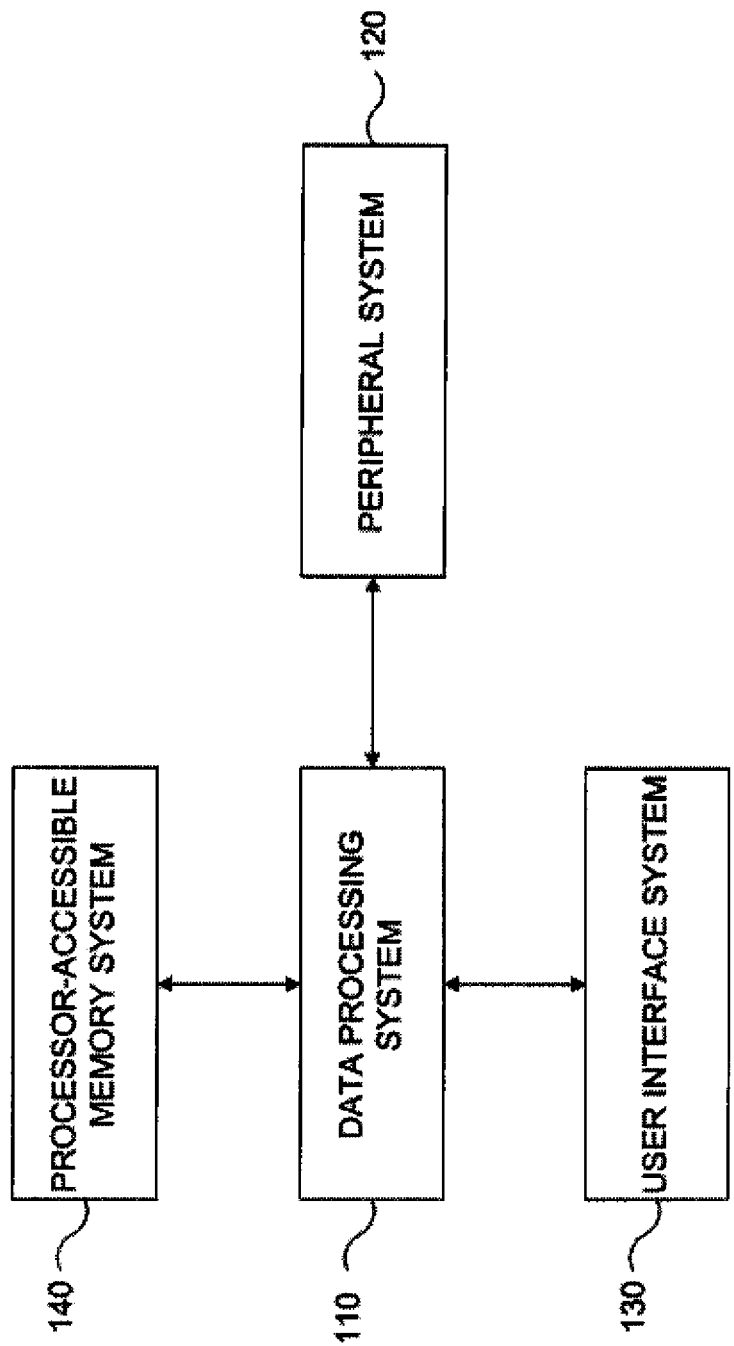
FIG. 1 is a high-level diagram showing the components of a system for producing a digital stereoscopic image according to an embodiment of the present invention.

FIG. 1 is a high-level diagram showing the components of a system for producing a digital stereoscopic image according to an embodiment of the present invention. The system includes a data processing system 110, a peripheral system 120, a user interface system 130, and a processor-accessible memory 140. The peripheral system 120, the user interface system 130 and the processor-accessible memory 140 are communicatively connected to the data processing system 110.

The data processing system 110 includes one or more data processing devices that implement the processes of the various embodiments of the present invention, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The processor-accessible memory 140 includes one or more processor-accessible memories configured to store information, including the information needed to execute the processes of the various embodiments of the present invention, including the example processes described herein. The processor-accessible memory 140 can be a distributed processor-accessible memory system including multiple processor-accessible memories communicatively connected to the data processing system 110 via a plurality of computers or devices. On the other hand, the processor-accessible memory 140 need not be a distributed processor-accessible memory system and, consequently, can include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data can be communicated. The phrase "communicatively connected" is intended to include a connection between devices or programs within a single data processor, a connection between devices or programs located in different data processors, and a connection between devices not located in data processors at all. In this regard, although the processor-accessible memory 140 is shown separately from the data processing system 110, one skilled in the art will appreciate that the processor-accessible memory 140 can be stored completely or partially within the data processing system 110. Further in this regard, although the peripheral system 120 and the user interface system 130 are shown separately from the data processing system 110, one skilled in the art will appreciate that one or both of such systems can be stored completely or partially within the data processing system 110.

The peripheral system 120 can include one or more devices configured to provide digital content records to the data processing system 110. For example, the peripheral system 120 can include digital still cameras, digital video cameras, cellular phones, or other data processors. The data processing system 110, upon receipt of digital content records from a device in the peripheral system 120, can store such digital content records in the processor-accessible memory 140.

The user interface system 130 can include a mouse, a keyboard, another computer, or any device or combination of devices from which data is input to the data processing system 110. In this regard, although the peripheral system 120 is shown separately from the user interface system 130, the peripheral system 120 can be included as part of the user interface system 130.

The user interface system 130 also can include a display device, a processor-accessible memory, or any device or combination of devices to which data is output by the data processing system 110. In this regard, if the user interface system 130 includes a processor-accessible memory, such memory can be part of the processor-accessible memory 140 even though the user interface system 130 and the processor-accessible memory 140 are shown separately in FIG. 1.

Figure 2:
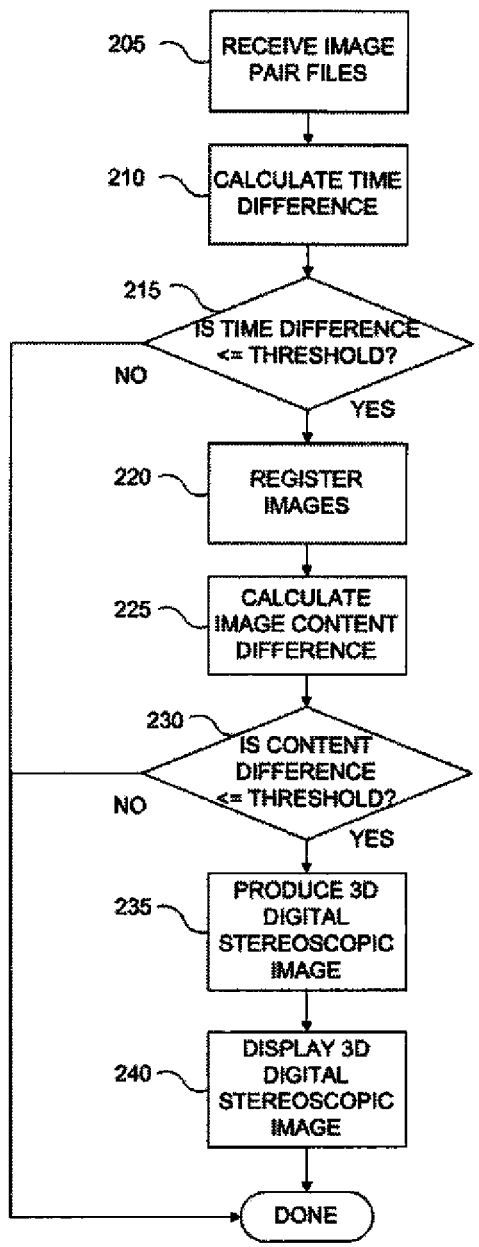
FIG. 2 illustrates a flow diagram of a method for producing a digital stereoscopic image in accordance with the present invention.

The present invention will now be described with reference to FIG. 2. There is shown a flow diagram illustrating a method for producing a digital stereoscopic image. In order to determine if a candidate pair of digital images can be processed to produce stereoscopic 3D content, an analysis of the image capture times and image content must be made. First, a pair of digital image files is received in step 205. Each digital image file has an associated time-of-capture indicating the date and time of capture. The time-of-capture is typically stored in the image file in a section of the file reserved for metadata. One example of an image file format that can be processed is the JPEG format which stores time-of-capture ("DateTimeOriginal") in the EXIF metadata. In step 210, the absolute value of the difference in time-of-capture (TIME DIFFERENCE) between the two images in the pair is calculated as:

$$\text{TIMEDELTA} = |\text{TOC}_a - \text{TOC}_b|$$

where $\text{TOC}_a$ is the time-of-capture for the first image and $\text{TOC}_b$ is the time-of-capture for the second image. TIME DIFFERENCE is then compared against a pre-determined TIME THRESHOLD in decision box 215. The determination of the TIME THRESHOLD is implementation dependent, but should represent the maximum amount of time between image captures that a pair of images can reasonably be expected. If TIME DIFFERENCE is greater than TIME THRESHOLD, "NO" for decision box 215, the process is complete and the image pair can be processed (if any is required) as non-stereoscopic images. If TIME DIFFERENCE is less than or equal to TIME THRESHOLD, "YES" for decision box 215, image content is now examined to further determine if the image pair is suitable for stereoscopic image processing. Prior to this determination, the images are aligned in step 220. Image alignment is required to insure that the image content comparison is done on the areas in which the images possibly have in common. Since candidates for stereoscopic processing presumably are of the same subject matter, image alignment involves identifying the common areas of the images by estimating the global motion between the images and then aligning the images to the common area. The resulting aligned images are suitable candidates for image content analysis.

Referring to FIG. 3A, the first step in image aligned, 305, is the estimation of global motion. There are many methods known to those skilled in the art for estimating global motion between two images. Examples include, but are not limited to, the following: "Global Motion Estimation in Image Sequences Using Robust Vector Field Segmentation", Proceedings ACM Multimedia 99, Orlando Fla., 30 Oct.-5 Nov. 1999, pp. 261-264 and U.S. Pat. No. 6,473,462 B1. The estimation of global motion 305 can be represented with horizontal and vertical motion components indicating the amount of motion between the two frames. These components represent the horizontal (X) and vertical (Y) offsets from the first frame to the second. Those skilled in the art will recognize that many global estimation methods also produce estimations in dimensions other than horizontal and vertical such as, depth or "Z" dimension. Motion estimation in the Z dimension, can also be used to align the images in other embodiments of the present invention.

Referring to FIG. 31B, there is shown two images, 380 and 382, containing the image of the same subject matter, a vase (384). Example horizontal motion offsets X and Y calculated by a global estimation method are shown with 386 and 388 respectively.

Figure 3B:
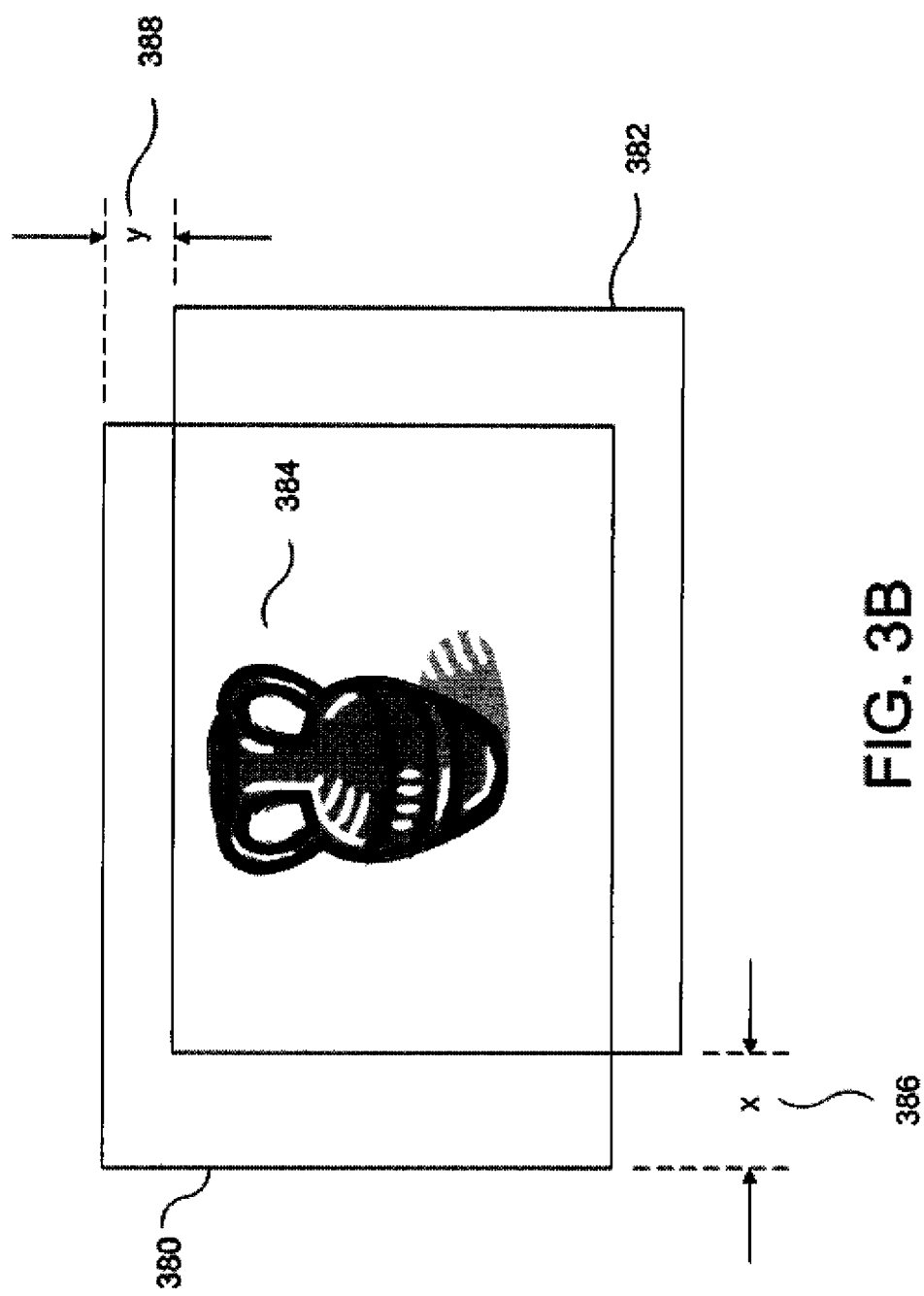
FIG. 3B is a diagram illustrating in more detail the measurements used in the align images block 220 shown in FIG. 3.
Figure 3C:
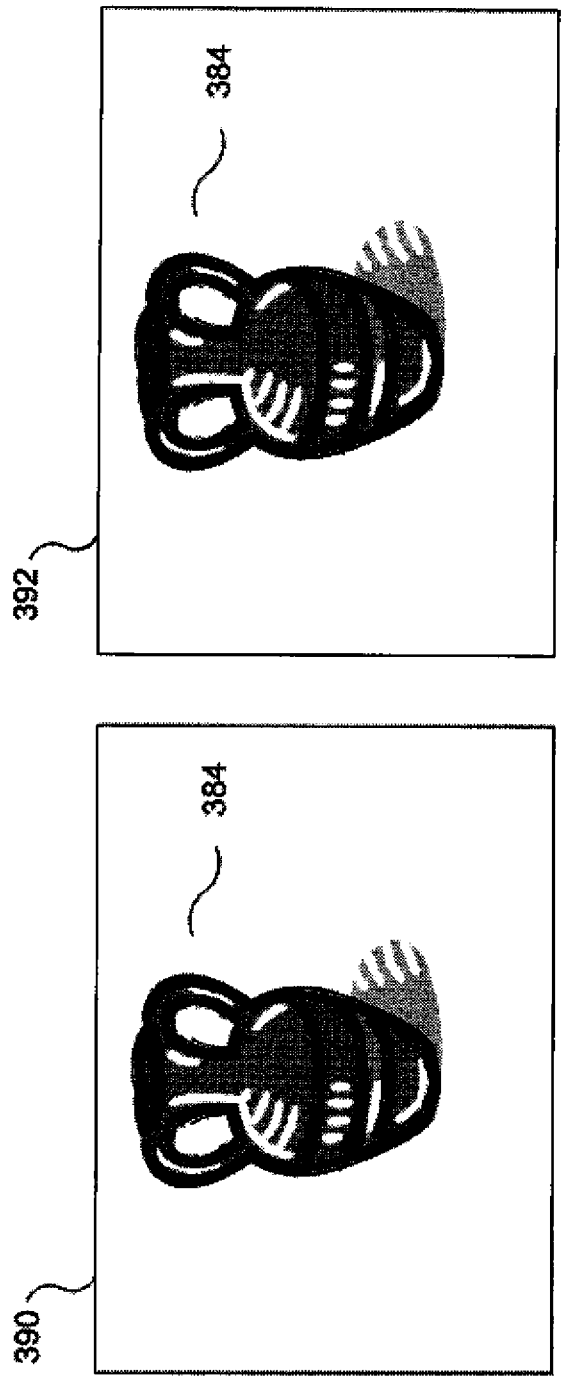
FIG. 3C is a diagram illustrating the pair of aligned images.

Referring back to FIG. 3A, step 310, aligned images are produced by cropping away the non-common areas of the images as defined by horizontal and vertical offsets determined in step 305 by the global motion estimation process. FIG. 3C shows an example of the aligned images 390 and 392 with subject matter 384 for original images 380 and 382 respectively (FIG. 3B).

Referring back to FIG. 2, using the aligned images provided by step 220, the IMAGE CONTENT DIFFERENCE is calculated in step 225.

Figure 4:
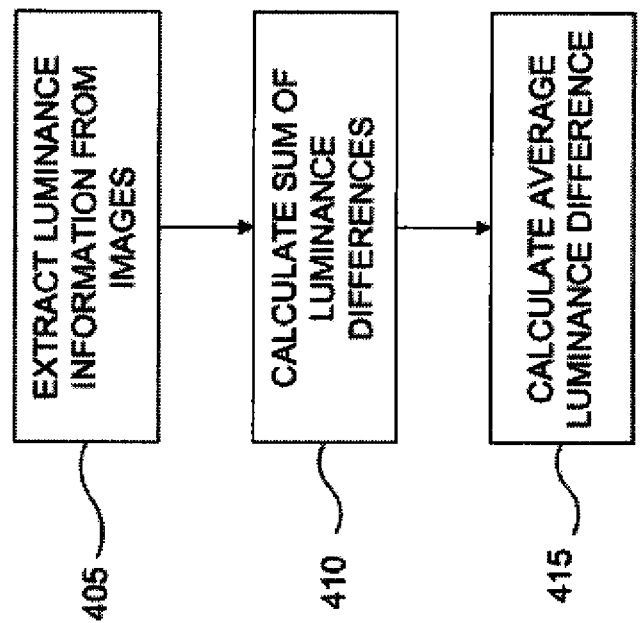
FIG. 4 is a flow diagram showing additional details of the calculate image content difference block 225 shown in FIG. 2.

Referring to FIG. 4, the first step (405) in calculating the IMAGE CONTENT DIFFERENCE is to determine the luminance information from every pixel in each image. One skilled in the art will recognize that there are many ways to determine luminance information. One method is to simply use the green component in an RGB color model. In step 410, the sum of all of the absolute values of the differences of each of the corresponding pixel luminance values from each image (SAD) is computed. In equation form, this can be expressed as:

$$SAD = \sum_{k=1}^{N} (|A_k - B_k|)$$

where N is the number of pixel luminance values in one of the images and A is the set of luminance values for the first image and B is the set of luminance values for the second image.

The sum from step 410 is divided by the total number of pixels in a luminance image to provide an average luminance difference in step 415. In an embodiment of the present invention, the average luminance difference is the IMAGE CONTENT DIFFERENCE. In equation form, this can be expressed as:

$$\Delta = \frac{SAD}{N}$$

where SAD is the sum of absolute differences from step 410 and N is the number of pixel luminance values from one image.

Referring back to FIG. 2, the IMAGE CONTENT DIFFERENCE provided by step 225 is then compared against a pre-determined IMAGE CONTENT THRESHOLD in decision box 230. The determination of the IMAGE CONTENT THRESHOLD is implementation dependent but should represent the maximum amount of difference between image capture content that a pair of images can reasonably be expected. If IMAGE CONTENT DIFFERENCE is greater than IMAGE CONTENT THRESHOLD, "NO" for decision box 230, the process is complete and the image pair can be processed (if any is required) as non-stereoscopic images. If IMAGE CONTENT DIFFERENCE is less than or equal to IMAGE CONTENT THRESHOLD, "YES" for decision box 230, the original image content received in step 205 is processed in step 235 to produce the digital stereoscopic image. Since stereoscopic image pairs are largely similar, most of the image content between two image pair files will be the same. This allows the technique described above to be sufficient for most image content similarities.

The 3D Stereoscopic Image 235 is dependent on the type of device that the 3D Image Content is going to be viewed. There are several competing methods to store 3D image. One of the methods to store digital stereoscopic images is the MPO (Multiple Picture Object) file format. This method uses the JPEG Exif header of the left image to store the second (right) image. This method had been used by Fuji FinePix Real 3D camera and associated digital frame. Consumer 3D televisions have several formats that are recognized including side-by-side JPEG and top-bottom JPEG digital stereoscopic images. A side-by-side format is a single image file that contains the left image and the right image of the digital stereoscopic image pairs rendered next to each other in the single image file.

Another method of storing digital stereoscopic images that is well known is the anaglyph image format. The anaglyph image format has been used since the 1950's and typically uses red and cyan filter glasses to filter the left and right images to achieve the stereo effect. A single image is made from the digital stereoscopic image pairs using the red channel from the left image and the green and blue channel from the right image. This will compromise the color reproduction because of the reduced color information used to create the anaglyph.

Once the 3D stereoscopic image is produced, the 3D stereoscopic image can be displayed 240 on a device such as a consumer 3D television using the side-by-side image file that was produced in 235. If the 3D stereoscopic image was produced as an anaglyph, it can be displayed using a conventional television or a computer monitor and be viewed using red-cyan anaglyph glasses.

The invention has been described in detail with particular reference to certain preferred embodiments thereof, but it will be understood that variations and modifications can be effected within the spirit and scope of the invention.

Parts List

110 Data processing system
120 Peripheral system
130 User interface system
140 Processor-accessible memory system
205 Receive image pair files step
210 Calculate time difference step
215 Time difference threshold comparison decision box
220 Align images step
225 Calculate image content difference step
230 Content difference threshold comparison decision box 235 Produce 3D Digital Stereoscopic Image step
240 Display 3D Digital Stereoscopic Image step
305 Estimate global motion step
310 Crop image to common area step
380 First digital image
382 Second digital image
384 Image of vase subject
386 Horizontal global motion estimate X
388 Vertical global motion estimate Y
390 First cropped image
392 Second cropped image
405 Extract luminance information from images step
410 Calculate sum of luminance differences step
415 Calculate average luminance difference step

The invention claimed is:

1. A method of producing a digital stereoscopic image, comprising using a processor to:
   a) provide a plurality of digital image files which include digital images and the time of capture of each image;
   b) use the times of capture to identify candidate pairs of images;
   c) analyze the image content of the candidate pairs of images by determining differences between the images of a candidate pair of images to identify at least one image pair that can be used to produce a digital stereoscopic image, wherein determining the differences comprises:
      i) computing the value of the difference between the luminance channels of candidate images;
      ii) computing the value of the difference of the candidate images and comparing that value against a time threshold value;
      iii) computing an image content difference value based, at least in part, on the value difference between the luminance channels of the candidate images and the value of the time difference of the candidate images; and
      iv) using the computed image content difference value to identify a pair of images that can be used to produce a digital stereoscopic image; and
   d) use the identified image pair to produce the digital stereoscopic image.

2. The method of claim 1, wherein each file includes metadata associated with each image that indicates the time of capture.

3. The method of claim 1, wherein step c) iv) further comprises comparing the image content difference value with a threshold value to determine if the pair of images can be used to produce a digital stereoscopic image.

4. The method of claim 1, further including presenting the digital stereoscopic image produced in step d) on a display or producing a hardcopy stereoscopic image on a medium.

5. The method of claim 1, wherein the candidate pair of images were captured in sequential chronological order.

6. A method of producing a digital stereoscopic image, comprising using a processor to:
   a) provide a plurality of digital image files which include digital images and the time of capture of each image;
   b) use the times of capture to identify candidate pairs of images;
   c) align candidate pairs of images;
   d) determine differences between the images of an aligned candidate pair of images, wherein determining the differences comprises:
      i) computing the value of the difference between the luminance channels of candidate images;
      ii) computing the value of the time difference of the candidate images and comparing that value against a time threshold value;
      iii) computing an image content difference value based, at least in part, on the value difference between the luminance channels of the candidate images and the value of the time difference of the candidate images; and
      iv) using the computed image content difference value to identify a pair of images that can be used to produce a digital stereoscopic image; and
   e) use the identified image pair to produce the digital stereoscopic image.

7. The method of claim 6, wherein each file includes metadata associated with each image that indicates the time of capture.

8. The method of claim 6, wherein step d) iv) further comprises comparing the image content difference value with a threshold value to determine if the pair of images can be used to produce a digital stereoscopic image.

9. The method of claim 6, further including presenting the digital stereoscopic image produced in step e) on a display or producing a hardcopy stereoscopic image on a medium.

10. The method of claim 6, wherein the candidate pair of images were captured in sequential chronological order.

* * * * *

UNITED STATES PATENT AND TRADEMARK OFFICE
CERTIFICATE OF CORRECTION

| | | |
|---|---|---|
| PATENT NO. | : 8,600,151 B2 | Page 1 of 1 |
| APPLICATION NO. | : 12/983343 | |
| DATED | : December 3, 2013 | |
| INVENTOR(S) | : Louis James Beato et al. | |

It is certified that error appears in the above-identified patent and that said Letters Patent is hereby corrected as shown below:

In the Claims
Column 7, line 30
(Claim 1, line 15) add the word --time-- after the phrase "computing the value of the".

Signed and Sealed this
First Day of April, 2014

Michelle K. Lee
*Deputy Director of the United States Patent and Trademark Office*